United States Patent [19]
Kaiwa et al.

[11] 3,970,371
[45] July 20, 1976

[54] APPARATUS FOR CHOPPING LIGHT BEAM

[75] Inventors: Yataro Kaiwa, Tokyo; Hiroshi Saito, Hasuda, both of Japan

[73] Assignee: Japan Servo Co., Ltd., Tokyo, Japan

[22] Filed: Mar. 15, 1974

[21] Appl. No.: 451,683

[30] Foreign Application Priority Data
Mar. 16, 1973 Japan.................. 48-30067

[52] U.S. Cl............................ 350/273; 58/23 A; 250/233
[51] Int. Cl.²........................................ G05D 25/00
[58] Field of Search ............ 250/232, 233; 350/266, 350/269, 273; 356/25, 26; 331/116 M, 154, 155, 157, 109, 182; 58/23 A, 28 R, 28 A, 28 B

[56] References Cited
UNITED STATES PATENTS

| | | | |
|---|---|---|---|
| 3,123,755 | 3/1964 | Braithwaite et al............. | 58/23 A X |
| 3,215,917 | 11/1965 | Buck ........................... | 331/116 M X |
| 3,554,655 | 1/1971 | Einstein ......................... | 356/207 X |
| 3,577,101 | 5/1971 | Pege ............................. | 350/269 X |
| 3,648,453 | 3/1972 | Aizawa et al.................. | 58/28 A X |

*Primary Examiner*—John K. Corbin
*Assistant Examiner*—Matthew W. Koren
*Attorney, Agent, or Firm*—Stewart and Kolasch, Ltd.

[57] ABSTRACT

A light beam chopping or intercepting apparatus capable of repeatedly and sequentially intercepting and passing a light beam at a regular cycle by rotatively vibrating a disk-shaped vibrating body in a casing, wherein the disk-shaped vibrating body and the casing have transparent windows through which the light beam is passed. A detection coil and an excitation coil are mounted on the inner wall of the casing, in respective positions opposite to two magnets provided on the disk-shaped vibrating body. A transistor circuit having these coils on its base side and on its collector side, respectively, is operated as the vibration generating source. Coiled springs installed between the rotation center shaft and the casing provide the repeating vibration force. The number of vibrations can be arbitrarily changed, for example, by adjusting the spring constants of the coil springs.

3 Claims, 6 Drawing Figures

APPARATUS FOR CHOPPING LIGHT BEAM

BACKGROUND AND SUMMARY OF THE INVENTION

The present invention relates to a vibration type light-beam chopping apparatus capable of providing an on-off light beam by the use of a vibrating disk which serves as a light-beam interceptor in the path of a light beam. The apparatus finds applications, for example, when used in conjunction with spectrophotometers and optical gas analyzers.

One known light-beam chopping apparatus is of the type wherein a partially cut-away disk rotatively driven by a DC motor is installed between a light source and a light receptor. In this system, however, the use of a motor is indispensable, with the result that the apparatus can hardly be constructed into a small size and also a complicated structure for preventing the leakage of the light beam must be used.

Another prior art light-beam chopping apparatus utilizes an AC exciting coil having an annular shape which is installed in a casing provided with a transparent window or a through-hole for the passage of a light beam. The coil is used as a stator, and a partially cut-away disk having a magnet in its circumferential portion is pivotally mounted on the casing, the magnet being used as a rotor. This system is advantageous in that the size of the apparatus can be reduced, the leakage of the light beam can be prevented, and the construction can be simplified. However, this system requires the use of an AC power source, and the cycle of light which is chopped is variable according to the cycle of the AC power source. To adjust the light chopping cycle, a frequency converter must additionally be used or the construction of the AC coil must be modified each time.

Accordingly, an object of the present invention is to provide a light-beam chopping apparatus which permits the light beam chopping cycle to be readily changed without the need for an AC power source.

Another object of the invention is to provide a light beam chopping apparatus which is simple in construction and driven by a transistor circuit which is operated from a DC battery power source.

A further object of the invention is to provide a light beam chopping apparatus which can be manufactured into a small size at a low cost and is operable with a minimum of light beam leakage.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
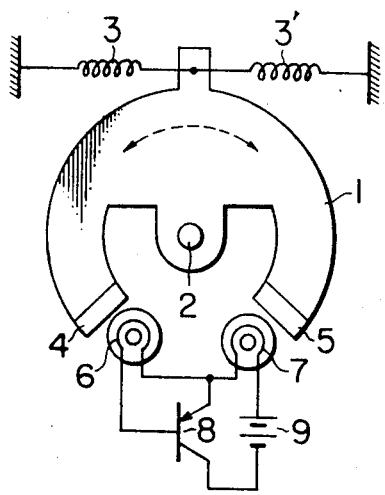
FIG. 1 is a circuit diagram illustrating the fundamental concept of one embodiment of the present invention.

Referring now to the drawings wherein like reference numerals are used throughout the various views to illustrate like parts, FIG. 1 shows a circuit diagram illustrating the fundamental concept of one embodiment of the present invention, wherein reference numeral 1 denotes a vibrating disk having a partially cut-away portion which serves as a light beam interceptor. The disk is made of a non-magnetic material. It is installed so as to be able to rotate and vibrate with the rotation of center shaft 2. Elements 3 and 3' denote coil springs for supplying a recurring vibration force to the disk 1, one end of each coil being secured to one point on the vibrating disk 1, and the other end being secured to a fixed support such as a casing. Elements 4 and 5 represent magnets fastened to two cut ends of the vibrating disk 1, and elements 6 and 7 represent a detection coil and an excitation coil, respectively, installed opposite to the magnets 4 and 5. These coils are connected to the base side and the collector side of a transistor 8. Element 9 represents a DC power source for driving the transistor 8.

The vibration system shown in FIG. 1 rotatively vibrates at a natural frequency which depends on the mass of the vibrating body, that is, the vibrating disk 1 and the center shaft 2 and on the spring constants of the coil springs 3 and 3'. A transistor circuit comprising the detection coil 6, the excitation coil 7, the transistor 8, and the DC power source 9 is provided in order to maintain the vibration system driven for rotation and vibration. When the vibrating disk 1 rotates on the shaft 2 in the counterclockwise direction, the magnetic flux of the magnet 4 is intercepted by the detection coil 6 which turns on the transistor 8 to cause current to flow in the excitation coil 7. As a result, an electromagnetic force is produced across the coil 7 to attract the magnet 5 thereby causing the vibrating disk to rotate clockwise. The displacement of the vibrating disk causes the magnet 4 to leave the zone of the detection coil 6. The polarity of the electromotive force produced across the detection coil is then inverted at the moment the magnet 4 leaves the detection coil 6 thus turning off the transistor 8. As a result, the current flowing in the excitation coil 7 stops. At this instant, the vibrating disk rotates counterclockwise by the energy stored in the coil springs 3 and 3', to cause the magnetic flux of the magnet 4 to be again intercepted by the detection coil 6. A series of these operations is repeated and thus the rotative vibration is maintained. The number of vibrations can readily be changed by changing the spring constants of the coil springs 3 and 3', that is, by changing the lengths of the coil springs.

Figure 2A:
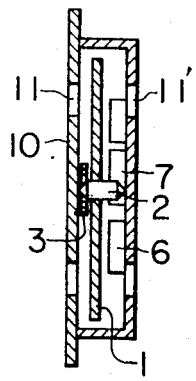
FIGS. 2a and 2b show a side cross sectional view and a plan cross sectional view, respectively, showing the embodiment in FIG. 1.
Figure 2B:
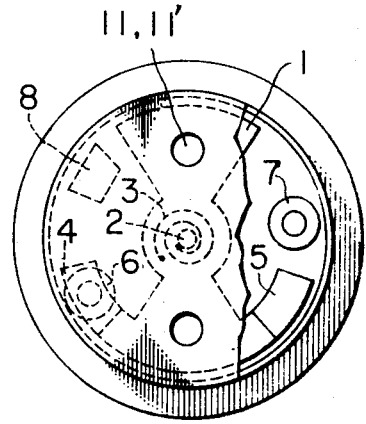

FIGS. 2a and 2b are cross-sectional views showing one embodiment of the present invention. In FIG. 2, a casing 10 is an outer structure of the light-beam chopping apparatus of the present invention. This casing functions to pivotally support the rotation center shaft 2, prevent the leakage of the light beam, secure one end of the coil spring 3, and provide a means to which is fastened the detection coil 6, the excitation coil 7 and the transistor 8. The casing 10 has transparent windows or through holes 11 and 11' for the passage of the light beam. The vibrating disk 1 is made of a non-magnetic material in the shape of a circular plate with a cut-away portion. The disk 1 has two projected magnet poles 4 and 5 and is secured to the rotation center shaft 2. Thus the disk 1 and the shaft 2 rotate together. The rotation center shaft 2 is pivotally supported by the casing 10 and connected to one end of the coil spring 3. The other end of the coil spring 3 is fastened to the casing 10. The detection coil 6 and the excitation coil 7 are formed by coiling a conductor wire in a cylindrical form and securing them to bases made of an insulating material. These coils are fastened to the casing 10 in positions opposite to the magnets 4 and 5, respectively. The transistor 8 is fastened to the casing 10. The DC power source (not shown in FIGS. 2a and 2b) is connected to the detection coil 6 and to the excitation coil 7 as shown in FIG. 1, in the configuration in the casing 10 as shown in FIGS. 2a and 2b.

Figure 3:
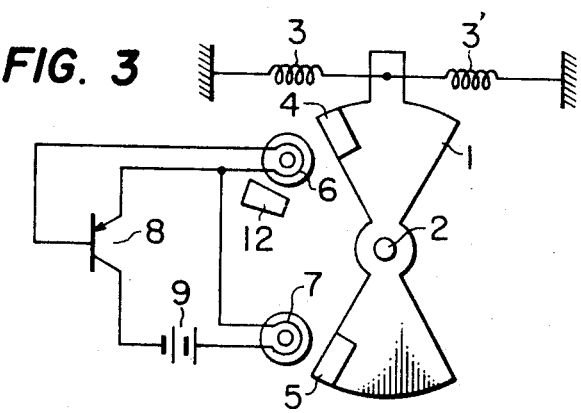
FIG. 3 is a circuit diagram illustrating the fundamental concept of another embodiment of the present invention.
Figure 4A:
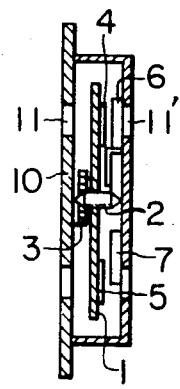
FIGS 4a and 4b show a side cross-sectional view and a plan cross-sectional view, respectively, showing the embodiment of FIG. 3.
Figure 4B:
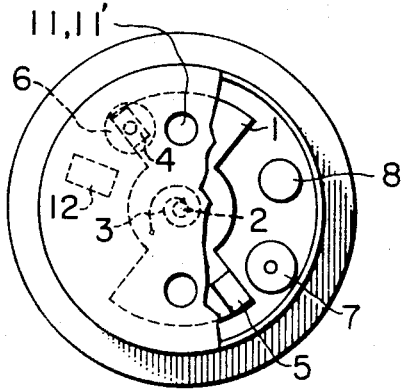

FIG. 3 is a circuit diagram for illustrating the fundamental concept of another embodiment of the present invention, and FIG. 4 shows sectional views of the apparatus utilized according to the embodiment of FIG. 3. This embodiment is similar to the embodiment shown in FIGS. 1 and 2, with the exception that a magnet 12 for controlling the amplitude of the vibrating disk is additionally utilized.

In the embodiment as in FIGS. 1 and 2, the amplitude of the vibrating disk 1 tends to change when the spring constants of the coil springs 3 and 3' are changed or the voltage of the DC power source 9 is changed. The purpose of the magnet 12 is to prevent the variation in the amplitude of the disk 1. In FIG. 3, when the vibrating disk 1 rotates through more than a given angle, the repulsion force exerted between the magnet 4 and the amplitude limiting magnet 12 becomes large, while the repulsion force between the magnet 5 and the amplitude limiting magnet 12 becomes small, whereby the amplitude of the vibrating disk 1 is kept constant at all times.

The vibration frequency of the vibrating disk 1 shown in FIGS. 2 and 4 depends on the mass of the vibrating body and on the spring constants of the coil springs, regardless of the power source voltage of the transistor circuit. The mass of the vibrating body is independent of temperature. The spring constant depends on the material and the shape of the spring used. The variation in the spring constant due to temperature variations can be made to be almost negligible by suitably choosing the material of the spring. Thus it is apparent that the vibration frequency of the apparatus of the present invention is substantially free of any influence ascribable to temperature change. Because the amplitude of the vibrating body 1 is controlled to be constant by the repulsion force of the magnet 12, the vibration frequency is thoroughly stabilised.

According to the present invention, as has been heretofore described, a stable vibration frequency can be maintained almost free of disturbances due to variations in temperature and voltage of the DC power source. As a result, the need for an AC power source is eliminated. Furthermore, the vibration frequency can easily be changed by simply changing the length of the coil spring. In addition, the apparatus of the present invention requires a smaller number of component elements, with the result that the apparatus can be manufactured in a small size at a low cost. Also, the apparatus is housed in a casing, resulting in complete interception of light beams.

In the embodiments as shown in FIGS. 2 and 4, the vibrating body 1 is in the shape of a disk which is partially cut away. The present invention is not limited to the disk disclosed, but any suitable structure may be employed. For example, a circular disk made of a transparent material may be used in such a manner that the disk is covered discontinuously with a non-transparent mask.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A light beam intercepting apparatus which comprises a casing containing at least one transparent window for the passage of a light beam therethrough, a disk-shaped vibrating body rotatably disposed within said casing, said disk-shaped body having a partially cut-away portion, two magnets located at different portions of said disk-shaped body, a detection coil and an excitation coil disposed in the inner wall of the casing at locations opposite to said two magnets, respectively, a transistor circuit having said detection coil and excitation coil in its base side and collector side, respectively, for supplying said rotating, vibration force to said disk-shaped body, spring means attached to said disk-shaped body and to the casing to provide a repeating rotational cycle to the disk-shaped body, said light beam passing through the transparent window being repeatedly intercepted by the repeating cycle of said disk-shaped body, and an additional magnet for controlling the amplitude of the rotating vibration of the disk-shaped vibrating body to a constant value, said additional magnet being disposed on the inner wall of the casing in close proximity to the detection coil, thereby causing the light beam to be turned on and off based on said cycle.

2. A method of systematically intercepting a light beam using a disk-shaped vibrating body containing first, second and third magnetic portions, said disk-shaped body being rotatably disposed within a casing having window portions for transmitting said light beam and spring means attached to the disk-shaped body and the casing, which comprises utilizing a transistor circuit containing a detection coil, an excitation coil, a transistor and a DC power source wherein when the disk-shaped body rotates in the counterclockwise direction, the magnetic flux of said first magnetic portion is intercepted by the detection coil which turns on the transistor to cause the current to flow in the excitation coil, which, as a result, an electromagnetic force is produced across the excitation coil to attract the second magnetic portion thereby causing the disk-shaped body to rotate clockwise, the displacement of the vibrating disk causing the first magnetic portion to leave the detection coil, said third magnetic portion being attached to the casing and in close proximity to the detection coil so that when the disk-shaped body rotates through more than a given constant angle, the repulsive force exerted between the fist magnetic portion and the third magnetic portion becomes large while the repulsive force between the second magnetic portion and the third magnetic portion becomes small, whereby the amplitude of the disk-shaped body is maintained constant at all times.

3. A light beam intercepting apparatus which comprises a casing containing at least one transparent window for the passage of a light beam therethrough, a disk-shaped vibrating body rotatably disposed within said casing, said disk-shaped body having a partially cut-away portion, two magnets attached to the respective ends of said disk-shaped body having said cut-away portion, a detection coil and an excitation coil disposed in the inner wall of the casing at locations opposite to said two magnets, respectively, an additional magnet for controlling the amplitude of the rotating vibration of the disk-shaped vibrating body to a constant value disposed on the inner wall of the casing in close proximity to the detection coil, a transistor circuit having said detection coil and excitation coil in its base side and collector side, respectively, for supplying a rotating, vibration force to said disk-shaped body, said transistor circuit including a DC power source for driving the transistor, and two spring coils, one end of each coil being secured to one point on the vibrating disk and the other end being secured to the casing to provide a repeating rotational cycle to the disk-shaped body, said light beam passing through the transparent window being repeatedly intercepted by the repeating cycle of said disk-shaped body, thereby causing the light beam to be turned on and off based on said cycle.

* * * * *